United States Patent [19]
Arnoux et al.

[11] 4,303,843
[45] Dec. 1, 1981

[54] MULTIPLE MAGNETIC FLYWHEEL DRIVEN BY A CENTRIFUGAL CLUTCH

[75] Inventors: Daniel Arnoux, St Germain en Laye; Gérard Koehler, Ville d'Avray; André Leconte, Le Vezinet; Claude Genter, Paris; Bernard Michel, Conflans St Honorine, all of France

[73] Assignee: Societe Chauvin Arnoux, Paris, France

[21] Appl. No.: 169,778

[22] Filed: Jul. 17, 1980

[30] Foreign Application Priority Data

Jul. 18, 1979 [FR] France ............................... 79 18586

[51] Int. Cl.³ ............................................. H02K 21/22
[52] U.S. Cl. .................................... 310/67 R; 310/156
[58] Field of Search ..................... 310/67, 156, 103, 74

[56] References Cited

U.S. PATENT DOCUMENTS

| | | | |
|---|---|---|---|
| 3,619,679 | 11/1971 | Carmichael | 310/67 |
| 3,710,158 | 1/1973 | Bachle et al. | 310/67 |
| 3,860,843 | 1/1975 | Kawasaki et al. | 310/67 |

Primary Examiner—Donovan F. Duggan

[57] ABSTRACT

A magnetic flywheel for a manually-driven magneto megohmmeter with step variable voltage comprising a rotor formed by a ring of magnetic material carrying permanent magnets, and a stator, disposed inwardly of the rotor and formed by an assembly of magnetic circuits each having a C-shape with a coil wound around the central portion thereof and with two pole surfaces at the ends. In order to reduce the starting torque, the number of pairs of permanent magnets is one less than the number of magnetic circuits, and the angular distance between the pole surfaces of one magnetic circuit is equal to the angular distance between two adjacent permanent magnets. Also, the arc length of each pole surface of a magnetic circuit is substantially equal to half the angular distance between two adjacent permanent magnets.

4 Claims, 4 Drawing Figures

MULTIPLE MAGNETIC FLYWHEEL DRIVEN BY A CENTRIFUGAL CLUTCH

BACKGROUND OF THE INVENTION

1. Field of the Invention

The present invention relates to a multipole magnetic flywheel for a hand-driven magneto megohmmeter with step variable voltage, comprising a rotor and a stator disposed inwardly of the rotor, said rotor including a ring of a magnetic material and an even number of permanent magnets carried by said ring and having magnetic axes which are angularly equidistant and disposed radially with respect to the axis of rotation of the rotor, each permanent magnet having a free pole face facing towards said axis of rotation, and said stator comprising an assembly of at least four angularly equidistant magnetic circuits, each magnetic circuit having a C-shape with a central portion having a coil disposed around it, and with end portions shaped so as to form a pole surface at each end, the pole surfaces of the magnetic circuits being disposed on a cylindrical surface situated close to the free pole faces of the permanent magnets.

2. Description of the Prior Art

Multipole magnetic flywheels having a structure similar to that indicated above, but for the ignition of internal combustion engines are for example described in French Pat. No. 2 386 925 and in British Pat. No. 979 956. In the British Pat. No. 979 956, all the coils do not have the same function, one of the coils being used for producing the ignition current, while the other coils are used for producing current for light or other sundry purposes. In the multipole magnetic flywheel described in French Pat. No. 2 386 925 and intended for use in an auto-cycle, the voltage supplied to a given load and depending on the speed of rotation is approximately regulated by the current-limiting effect provided by the leakage inductance of the coils depending on the frequency.

In the case where the magnetic flywheel is intended to supply a crank magneto megohmmeter, greater stability of the generated voltage is required. It is known to use for this purpose a centrifugal clutch connecting the crank to the magnetic flywheel as long as a predetermined speed of rotation has not been reached, and disconnecting the magnetic flywheel from the crank as soon as the desired speed has been reached.

Furthermore, to avoid having to turn the driving crank too fast, a step-up gear-train is provided between the crank and the clutch.

Finally, for some improved megohmmeters, it is required to be able to carry out insulation resistance measurements at different voltages, for example from 500 to 5000 Volts.

The presence of several magnetic circuits then allows the voltage to be varied by steps by means of a step-switch, and the independence of the magnetic circuits enables the air gaps of each circuit to be adjusted separately, so as to adjust each of the voltages to the desired values.

There appears however a difficulty due to the starting torque. It is known that a slot effect exists between the projecting poles of the inducting magnets and the edges of the pole surfaces of the magnetic circuits. The result is that the crank must supply a starting torque proportional:

—on the one hand, to the product of the total magnetic flux generated by the magnets multiplied by its angular derivative, —and on the other hand, to the step-up ratio of the gear-train.

This torque must be limited for easy use of the megohmmeter and also to avoid damage to the gears.

There may also occur slipping of the clutch before succeeding in driving the rotor.

In order to reduce the slot effect, it is known to have an armature with oblique slots with respect to the inductor, but this arrangement is costly and causes a loss of power.

French Pat. No. 2 392 525 indicates a means for reducing the starting torque, but this solution is not applicable in the present case.

SUMMARY OF THE INVENTION

The main object of the present invention is to reduce the starting torque of a magnetic flywheel of the type described above for a hand-driven magneto megohmmeter with step variable voltage. Another object of the invention is to better adapt such a magnetic flywheel to the use contemplated, in particular insofar as rectifying the alternating voltage generated and obtaining voltages varying by steps are concerned.

To this end, the magnetic flywheel of the invention is characterized in that the number of pairs of permanent magnets is one less than the number of magnetic circuits, and the angular distance between the pole surfaces of one magnetic circuit is substantially equal to the angular distance between two adjacent permanent magnets, whereby the angular distance between two adjacent pole surfaces of two adjacent magnetic circuits is smaller than the angular distance between two adjacent permanent magnets, and in that the arc of each pole surface of a magnetic circuit is substantially equal to half the angular distance between two adjacent permanent magnets.

In a particular embodiment of the invention, the number of magnetic circuits is even and preferably equal to six.

BRIEF DESCRIPTION OF THE DRAWINGS

Other ojects, features and advantages of the invention will appear in the following description, given by way of non-limiting example, with reference to the drawings in which.

DESCRIPTION OF THE PREFERRED EMBODIMENTS

Figure 1:
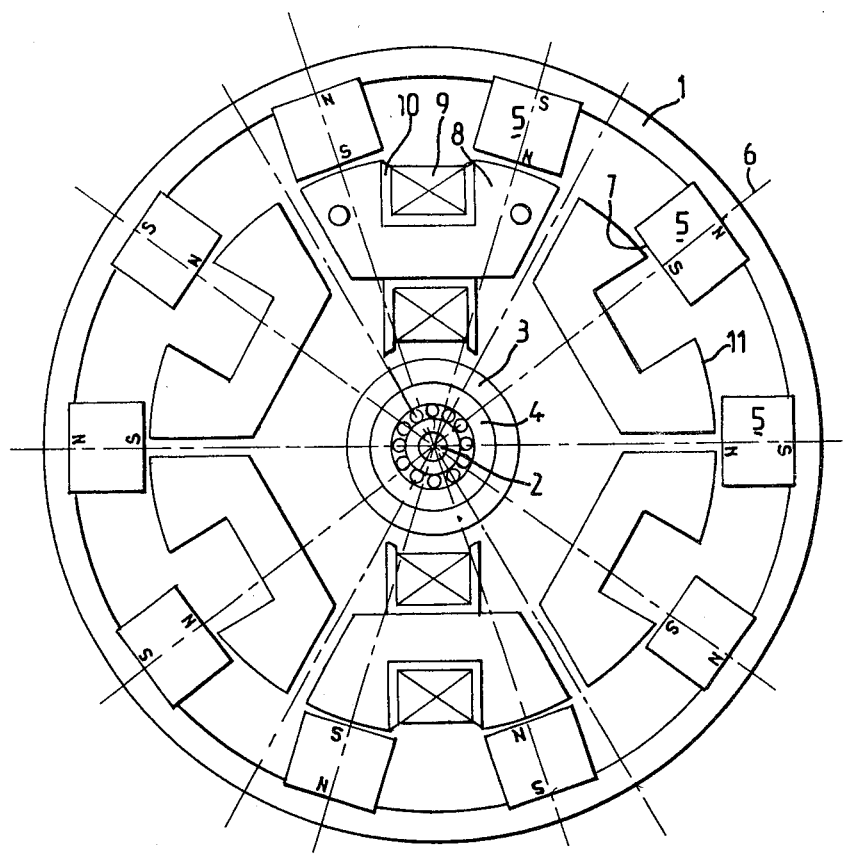
FIG. 1 shows the rotor and of the stator of a magnetic flywheel of the invention, having six magnetic circuits.

In FIG. 1 there is shown at 1 a cylindrical ring rotating about an axis 2. Ring 1 may for example be carried by or integral with a rotating flange (not designated in FIG. 1) having a hub 3 in which are fitted two axially spaced ball bearings 4 mounted on axis 2. Ring 2 may rotated by means of a crank drivingly connected thereto through a step-up gear-train and a centrifugal clutch in a known way. The crank, gear-train and clutch have not been shown since their arrangement is known and description thereof is not necessary for the understanding of the invention.

Permanents magnets 5 are disposed on the inner face of ring 1. They have magnetic axes 6 which are angularly equidistant and disposed radially with respect to the axis of rotation 2. They may for example be bonded to flat surface portions of the inner face of ring 1. Magnets 5 have preferably a circular cross-section and they are preferably made from a material presenting small magnetic characteristic variations with respect to the temperature, such as a metal alloy of aluminium, nickel, cobalt, so-called "Ticonal 600" or "Alnico 500".

Permanent magnets 5 each have a free pole face 7, facing towards the axis of rotation 2. This face 7 is preferably flat.

Inwardly of the rotor formed by ring 1 and permanent magnets 5 is a stator formed by an assembly of angularly equidistant magnetic circuits 8. In FIG. 1, the stator comprises six magnetic circuits 8.

Each magnetic circuit 8 has a C shape, with a rectilinear central portion carrying a coil 9 wound on a coil-frame 10. The parallel inner edges of the end-portions of the C-shape magnetic circuit 8 allow direct winding on the coil-frame 10, itself already mounted on the magnetic circuit.

The ends of the C-shape magnetic circuit 8 are shaped so as to form at each end a pole surface 11.

Figure 2:
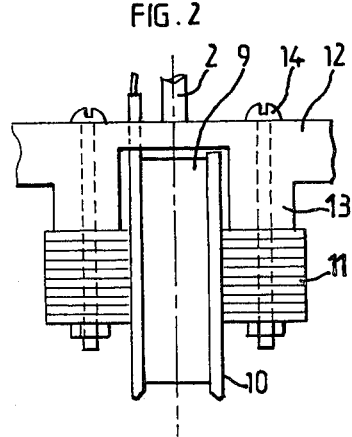
FIG. 2 shows a detail of a magnetic circuit of the stator.

Pole surfaces 11 are all disposed in a known way on a cylindrical surface situated close to the free pole faces 7 of the magnets, so as to form the air gaps of the magneto-electric machine. To this end, the magnetic circuits 8 may for example be mounted on a fixed flange 12 as shown in FIG. 2. In FIG. 2, it can be seen that the fixed flange 12, preferably made from an insulating molded material, comprises shoulders 13 to which magnetic circuit 8 is fixed by means of screws 14. Each magnetic circuit 8 is preferably laminated, i.e. formed by a stack of thin plates. One end flange of coil-frame 10 has an extension which passes through an opening in flange 12 so as to lead out the terminals of the coil.

In FIG. 2, it can also be seen that the pole surfaces 11 of each magnetic circuit 8 have, in a direction parallel to the axis of rotation 2, a constant width. This width is substantially equal to the diameter of permanent magnets 5.

It can also be seen in FIG. 1 that the chord of the arc of a pole surface 11 is substantially equal to the diameter of the magnets 5.

It is known that the number of magnets of an inductor must be even so that the north and south poles alternate on the air-gap surface. It follows that the number p of pairs of magnets is an integer.

In the conventional magnetic flywheel or magnets arrangement, such as that which is disclosed in the above-mentioned French Pat. No. 2 386 925, the pole surfaces 11 are evenly distributed angularly, and the angular distance between two pole surfaces 11 belonging to the same magnetic circuit is equal to the angular distance between two adjacent pole surfaces 11 belonging to two different magnetic circuits. These angular distances are also equal to the angular distance between the axes of two adjacent permanent magnets. It results from this arrangement that the number n of magnetic circuits is equal to the number p of pairs of magnets. The driving force necessary for starting the magnetic flywheel must then overcome simultaneously the slot effects of all the magnetic circuits.

On the other hand, in the arrangement of FIG. 1, it can be seen that for the six magnetic circuits 8 there are only ten magnets 5. In other words, the number p of pairs of permanent magnets 5 is one less than the number n of magnetic circuits 8.

In order that a magnetic circuit 8 may receive the maximum flux generated by two adjacent magnets 5, it is necessary for the two pole surfaces 11 of said magnetic circuit to face a respective magnet at the same time, i.e. that the angular distance between the pole surfaces 11 of the same magnetic circuit 8 is equal to the angular distance between two adjacent permanent magnets 5.

This condition is satisfied in the arrangement of FIG. 1.

Consequently, the angular distance between two adjacent pole surfaces 11 of two adjacent magnetic circuits 8 is smaller than the angular distance between two adjacent permanent magnets 5.

Figure 3:
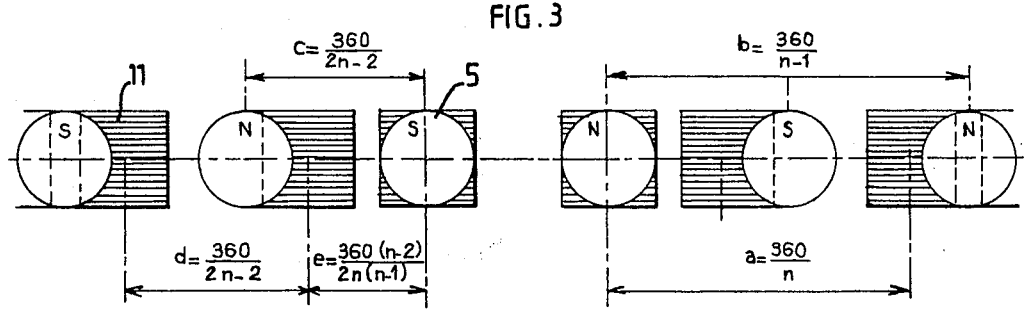
FIG. 3 shows a flat transposition of the magnets traveling past the magnetic circuits of the stator.

More precisely, the relationship between these angles is given in FIG. 3, in which the representation has been made with N=6 magnetic circuits, but which is valid for other values of n.

In FIG. 3, the permanent magnets 5 are shown by circles and the pole surfaces 11 are shown by squares with lines showing the stacking of the plates of the magnetic circuits 8.

The angular pitch between two adjacent magnetic circuits 8 corresponds by definition to the angle a =(360/n).

Since it is assumed that p=n-1 pairs of magnets, the angle between two magnet poles of the same polarity is $$b = \frac{360}{n-1}$$

and the angle between two adjacent magnets is $$c = \frac{360}{2n-2}.$$

Angle a is the sum of angle d between the pole surfaces 11 of one magnetic circuit 8 and of angle e between two adjacent pole surfaces 11 of two adjacent circuits 8 (a=d+e).

Now, it has been seen that the condition d=c must be satisfied, i.e.:

$$d = \frac{360}{2n-2}.$$

Consequently $$e = 360 \left( \frac{1}{n} - \frac{1}{2n-2} \right)$$

i.e.

$$e = \left[ \frac{n-2}{2n(n-1)} \right].$$

If n=2, e=0, which is impossible.

At least three magnetic circuits are therefore required.

On the other hand, for a clearance to exist between two adjacent magnetic circuits 8, it is necessary for the arc of a pole surface 11 to be smaller than the value e.

Furthermore, the value of this pole surface arc is advantageously substantially equal to half the angle c between two adjacent magnets 5, so that magnetic circuit 8 does not remain without appreciable flux variation after a pair of permanent magnets 5 has left the pole surfaces 11 and before the next pair of magnets 5 arrives.

It can be seen that this last condition is not satisfied for n=3. In fact, we have then e=30° and the arc of a pole surface 11 may be fixed between 24° and 26°, whereas c=90°, which means that there remains an angle of more than 60° between the edges of two adjacent magnets 5.

For n=4, we have e =(c/2)=30°, which means that the arc of a pole surface 11 is smaller than half of angle c only by the value of the angle between the edges of two adjacent magnetic circuits 8, which is acceptable.

For n≧5, up to for example n=16, it can be noted surprisingly that the difference e−(c/2) remains between 4.5° and 6.5°, which allows the above condition to be complied with.

The number n of magnetic circuits 8 is therefore at least equal to four and it may be chosen in accordance with the requirements of the intended use: number of voltage levels required, starting torque, available volume, cost, etc.

Coming back to the starting torque of the magnetic flywheel of FIG. 1, it can be seen that the respective positions of permanent magnets 5 with respect to the magnetic circuits 8 are the same for diametrically opposed circuits. That comes from the fact that number n is even. In this case, the starting torque results from the slot effect of two magnetic circuits 8 instead of six circuits if we had p=n. Its value is therefore divided by 3.

Furthermore, with permanent magnets 5 having a circular cross-section, it can be seen in FIG. 3 that the facing surface between a permanent magnet 5 and a pole surface 11 varies progressively depending on the angle of rotation, which further reduces the slot effect. The arrangement is less costly than that consisting in having a rectangular section for the magnet and a circular section for pole surface 11. Furthermore, the flat pole face 7 of magnets 5 further contributes to reducing the slot effect, while simplifying manufacture.

Figure 4:
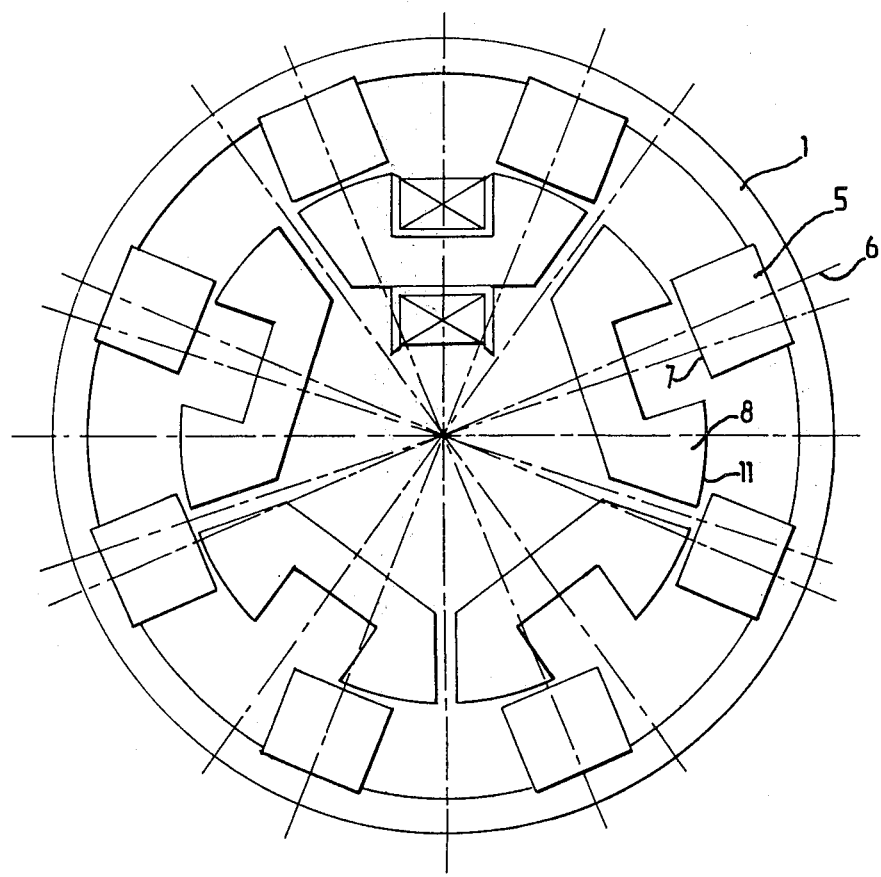
FIG. 4 shows a magnetic flywheel similar to that of FIG. 1, but having five magnetic circuits.

Referring now to FIG. 4, we find again elements 1,5,6,7,8 and 11 of FIG. 1, but there are five magnetic circuits 8 and eight magnets 5.

Magnets 5 are a little wider than in FIG. 1 so that the distance between two adjacent magnets remains substantially equal to the width of a magnet.

It can be seen that it is possible to find an arrangement of the magnetic circuits 8 fulfilling the preceding conditions. The difference e −(c/2) is then 4.5°.

It is easy to design magnetic flywheels having a larger number of magnetic circuits, but for the intended use six magnetic circuits 8 are generally sufficient. In this case, the six coils 9 may be assigned the following functions:

1st coil: Circuit for a low-voltage continuity ohmmeter.
2nd coil: 500 V by full-wave rectification.
3rd coil: 500 V by full-wave rectification, giving 1000 V with the 2nd coil.
4th coil: 1000 V by rectification with voltage doubling, giving 2000 V with the 2nd and 3rd coils.
5th and 6th coils: 1500 V each by rectification with voltage doubling, giving 5000 V with the preceding coils.

In the case of FIG. 1, since the diametrically opposite coils have identical positions with respect to the permanent magnets (n even), it can be seen that two coils may be connected in series before rectification, which brings a simplification.

It is known that in some magneto-electric generators with projecting poles, the inductor may be wider than the notch in which the armature coil is housed. However, in the arrangement of the invention, with the method of winding the coil, it is advantageous to have as wide a notch as possible. Furthermore, by widening the notch, the sine-wave shape of the induced voltage is modified by reducing the peak value of this voltage. This characteristic is advantageous in the present case for it results in smaller variations of the rectified voltage with respect to the load.

What is claimed is

1. In a multipole magnetic flywheel for a hand-driven magneto megohmmeter with step variable voltage, comprising a rotor and a stator disposed inwardly of the rotor, said rotor including a ring made of a magnetic material and an even number of permanent magnets carried by said ring and having magnetic axes which are angularly equidistant and disposed radially with respect to the axis of rotation of the rotor, each permanent magnet having a free pole face facing towards said axis of rotation, and said stator comprising an assembly of at least four angularly equidistant magnetic circuits, each magnetic circuit having a C-shape with a central portion having a coil disposed around it, and with end portions shaped so as to form a pole surface at each end, the pole surfaces of the magnetic circuits being disposed on a cylindrical surface situated close to the free pole faces of the permanent magnets, the improvement consisting in that the number p of pairs of permanent magnets is one less than the number n of magnetic circuits, and the angular distance between the pole surfaces of one magnetic circuit is substantially equal to the angular distance between two adjacent permanent magnets, whereby the angular distance between two adjacent pole surfaces of two adjacent magnetic circuits is smaller than the angular distance between two adjacent permanent magnets, and the arc of each pole surface of a magnetic circuit is substantially equal to half the angular distance between two adjacent permanent magnets.

2. The magnetic flywheel as claimed in claim 1, wherein the number n of magnetic circuits is even.

3. The magnetic flywheel as claimed in claim 2, wherein the number n of magnetic circuits is equal to six.

4. The magnetic flywheel as claimed in claim 1, wherein the cross-section of each permanent magnet is circular, the free pole face of each permanent magnet is flat and the pole surfaces of each magnetic circuit have, in a direction parallel to the axis of rotation, a constant width.

* * * * *